United States Patent [19]

Strong et al.

[11] Patent Number: 5,331,603
[45] Date of Patent: Jul. 19, 1994

[54] MAGNETIC HEADING SENSOR ALIGNMENT AND ROLL REDUCING DEVICE

[75] Inventors: David N. Strong, East Haddam; Daniel L. Baker, North Stonington, both of Conn.

[73] Assignee: The United States of America as represented by the Secretary of the Navy, Washington, D.C.

[21] Appl. No.: 33,224

[22] Filed: Mar. 18, 1993

[51] Int. Cl.$^5$ .............................................. G01V 1/38
[52] U.S. Cl. .................................... 367/12; 367/130; 367/106; 367/19
[58] Field of Search ............... 367/12, 13, 19, 106, 367/130, 153; 114/246, 253; 33/355 R; 248/603; 267/160; 324/260, 261, 262; 335/209

[56] References Cited

U.S. PATENT DOCUMENTS 5,034,712   7/1991   Strong ................................ 367/130

Primary Examiner—Daniel T. Pihulic
Attorney, Agent, or Firm—Michael J. McGowan; Prithvi C. Lall; Michael F. Oglo

[57] ABSTRACT

A magnetic heading sensor alignment and roll reducing device is provided. A generally cylindrical assembly has a first end and a second end. Each end has a plurality of grooves located equiangularly on a circle with the center thereof located at the cylindrical assembly's center longitudinal axis. Bearings, positioned at and supported by the first and second ends, support a magnetic heading sensor at either end thereof. The bearings provide the sensor with rotational freedom about the center longitudinal axis. A counterweight is affixed to the sensor such that its center of gravity and the sensor's center of gravity are located at a common axial loci. A plurality of longitudinal spring strips are provided to fit into corresponding ones of the grooves on the first and second ends of the cylindrical assembly. The spring strips cooperate with the inner surface of a tubular housing when the device is inserted therein. All materials used to construct the device are non-magnetic.

10 Claims, 1 Drawing Sheet

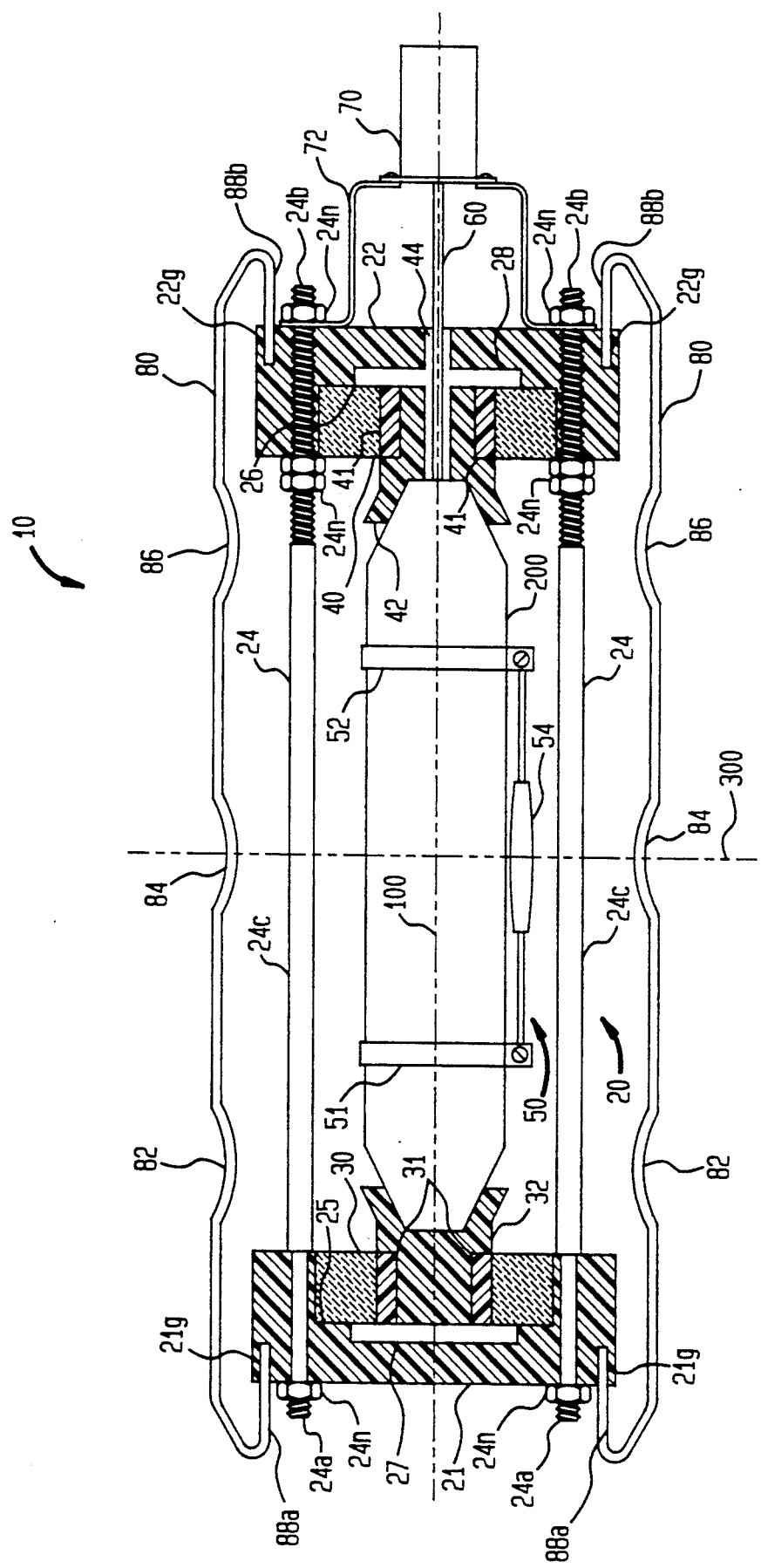

MAGNETIC HEADING SENSOR ALIGNMENT AND ROLL REDUCING DEVICE

STATEMENT OF GOVERNMENT INTEREST

The invention described herein may be manufactured and used by or for the Government of the United States of America for Governmental purposes without the payment of any royalties thereon or therefor.

BACKGROUND OF THE INVENTION (1) Field of the Invention

The present invention relates generally to acoustic towed arrays, and more particularly to a magnetic heading sensor alignment and roll reducing device for accurately positioning a magnetic heading sensor in a towed line array and for reducing unwanted roll movement of the sensor when the towed array is deployed and operated.

(2) Description of the Prior Art

Towed line arrays are used extensively in submarines, surface ships and oil exploration for detection purposes. A towed acoustic line array includes a liquid-filled hose containing a linear array of hydrophones for sound detection and magnetic heading sensors for position determination. A mechanically rugged KEVLAR sheet or web is wrapped around the various elements, which is then placed inside a liquid filled hose.

The hydrophones and magnetic heading sensors are distributed inside the hose in a predetermined configuration together with their associated electronics including their power sources. These sensors are generally different types depending upon operational requirements. The towed line arrays form an acoustic beam pattern which is used for the detection of targets in the area under surveillance. Additionally, it is important to accurately determine the position of the acoustic sensors and the towed line array as a function of time. Towards this end, a series of magnetic heading sensors are distributed along the length of the towed line array. It is desirable to have relatively small magnetic heading sensors for accurate position determination.

It is imperative to keep the magnetic heading sensors aligned within the hose and symmetrical with respect to the longitudinal axis passing through the center of the hose. Any misalignment of the magnetic heading sensors results in erroneous heading measurements. In an effort to solve this problem, U.S. Pat. No. 5,034,712 discloses a magnetic heading sensor alignment device for maintaining a sensor along the longitudinal axis of a surrounding hose. However, the sensor is still subject to pitch, yaw and/or roll in accordance with movement of the towed line array as it is deployed and operated. Although operationally unavoidable, such movement causes the sensor to react unfavorably leading to electromagnetically induced error (i.e., by movement of conductors through a magnetic field). It is therefore desirable to have a simple device which will not only maintain the sensor position along the central longitudinal axis of the hose, but also reduce as much ambient unwanted movement of the sensor as possible.

SUMMARY OF THE INVENTION

Accordingly, it is an object of the present invention to provide a magnetic heading sensor alignment device that reduces unwanted movement of the sensor to thereby decrease the amount of induced sensor error.

Another object of the present invention is to provide a magnetic heading sensor alignment device for installation in a towed line array's hose such that roll movement of the towed line array does not induce sensor error.

Other objects and advantages of the present invention will become more obvious hereinafter in the specification and drawings.

In accordance with the present invention, a magnetic heading sensor alignment and roll reducing device is provided for installation in a flexible tubular housing. A rigid cage houses a magnetic heading sensor having signal lines extending from one end thereof. The cage has spaced end walls with recessions in their respective ends. A bearing is mounted in each of the recessions for receiving the sensor's ends and enabling the sensor to freely rotate about the cage's central longitudinal axis. At one end of the cage, the cage and corresponding bearing define a coaxial sleeve through which the signal lines may freely pass. A counterweight is affixed to the sensor such that the center of gravity of the counterweight is aligned with the center of gravity of the sensor. A slip ring is mounted to an outer face of the end wall through which the signal lines project. The slip ring provides a rotating electrical connection with the signal lines. A plurality of longitudinally extending strips of a non-magnetic metallic spring stock are mounted in the end walls and are disposed at equiangular positions about the periphery of the cage. The strips cooperate with the inner surface of the tubular housing when the device is inserted therein to resiliently maintain the device at an axially concentric position therein.

BRIEF DESCRIPTION OF THE DRAWING(S)

Other objects, features and advantages of the present invention will become apparent upon reference to the following description of the preferred embodiments and to the drawings, wherein:

The sole figure is a side view of the magnetic heading sensor alignment and roll reducing device according to a preferred embodiment of the present invention, which is in part a cross-section and in part a side elevation.

DESCRIPTION OF THE PREFERRED EMBODIMENT(S)

Referring now to the drawing, a preferred embodiment magnetic heading alignment and roll reducing device 10 according to the teachings of the present invention is shown. For ease of understanding, the figure is a combination of a side elevation and a cross-section, with the cross-section being designated by appropriate hatching. Device 10 includes a rigid cage assembly 20 having end pieces 21 and 22 made of a non-magnetic material such as polycarbonate (LEXAN), plastic or fiberglass. End pieces 21 and 22 are connected to one another and held in a spaced apart relationship by a plurality of non-magnetic rods 24. While only two are shown, three or more rods 24 would be used to construct a rigid cage assembly 20. Each rod 24 is configured to have a central support section 24c and threaded ends 24a and 24b passing through end pieces 21 and 22, respectively. Threaded ends 24a and 24b are held in place by a plurality of cooperating nuts 24n. Note that each threaded end 24b is selected to be long enough to allow for adjustment in the overall length of cage assembly 20. In this way, device 10 is adaptable for magnetic heading sensors of varying length. Rods 24, as well as nuts 24n, are typically made from a non-magnetic material such as full hard brass.

End pieces 21 and 22 are provided with respective recessions 25 and 26 for housing bearing assemblies 30 and 40. Each bearing assembly 30 and 40 has respective rotating mechanisms 31 and 41. End pieces 21 and 22 are further typically provided with respective counter bores 27 and 28 so that any protrusions from respective rotating mechanisms 31 and 41 do not interfere with the rotation thereof. Bearing assemblies 30 and 40 are preferably conventional ceramic bearing assemblies that are press-fit into respective end pieces 21 and 22. Rotating mechanisms 31 and 41 must be fabricated from a non-magnetic material (e.g., plastic) and are free to rotate about the central longitudinal axis 100 of cage assembly 20. Bearing assemblies of this type are available in various sizes/configurations from Heany Industries, Scottsville, N.Y.

Press-fit into and extending from bearing assemblies 30 and 40 are sensor holders 32 and 42 made from a non-magnetic material for fixably holding the ends of a magnetic heading sensor 200. The sensor holders are typically made from polycarbonate (LEXAN) plastic or fiberglass. Sensor 200 is press-fit into sensor holders 32 and 42 as shown and is held in fixed relation thereto by pressure applied by rods 24 cooperating with end pieces 21 and 22. In addition to the above described features, bearing assembly 40 and sensor holder 42 define a coaxial sleeve 44 that is generally coincident with central longitudinal axis 100, the purpose of which will become apparent later in the description.

As shown in the figure, the shape of the ends of sensor 200 dictate the shape of the sensor holders 32 and 42. Thus, it is to be understood that shaping of sensor holders 32 and 42 is a design choice predicated on the choice of sensor. For the preferred embodiment, sensor 200 was a Digicourse Model 322-T flux gate magnetometer.

Attached in a fixed relationship to sensor 200 is a counterweight assembly 50 that includes C-clamps 51 and 52 that wrap around sensor 200, and a counterweight 54 connected between clamps 51 and 52. The entire counterweight assembly 50 is constructed from a non-magnetic material such as full hard brass. Further, it is to be understood that counterweight assembly 50 could be made in a variety of ways. For example, the counterweight might just be a weight that is glued to sensor 200. Counterweight assembly 50 is aligned with sensor 200 such that their respective centers of gravity are generally axially coincident, i.e., they lie in a transverse plane at a single axial position or a single axial loci. This has been symbolically indicated in the figure by dashed line 300 which represents such a transverse plane. Once attached to sensor 200, counterweight assembly 50 maintains sensor 200 in a fixed rotational relationship to the earth's gravitational field since sensor 200 is free to rotate about central longitudinal axis 100 via bearing assemblies 30 and 40.

Since a magnetic heading sensor typically has signal and power leads 60 extending from one end thereof, bearing assembly 40 has been provided with axial sleeve 44. Leads 60 pass through sleeve 44, i.e., through bearing assembly 40 and end piece 22. Leads 60 terminate in a slip ring assembly 70 attached to end piece 22 by a non-magnetic (e.g., brass) bracket 72. One means of attaching bracket 72 is to use threaded ends 24b along with nuts 24n as shown in the figure. Slip ring 70 may be any conventional slip ring known in the art that permits rotating electrical connections to stationary circuits.

Device 10 further includes a plurality of non-magnetic strips 80, only two of which are shown. Strips 80 are preferably made of full hard brass. The number of strips required is at least three since device 10 is to be aligned and maintained within a generally cylindrical line array hose. Each strip 80 is configured to provide spring-like action. Thus, the plurality of strips 80 define a generally cylindrical structure about cage assembly 20 that provides spring action when device 10 is inserted inside the towed line array hose. Each strip may have bends 82, 84 and 86 to enhance its spring action. End sections 88a and 88b of strip 80 are used to secure each strip into respective drilled holes or grooves 21g and 22g in end pieces 21 and 22. Three or more strips 80 are spaced in an equiangular fashion about the periphery of cage assembly 20. In other words, three strips would require spacing of 120° therebetween, four strips would require spacing of 90° therebetween, etc.

The advantages of the present invention are numerous. Once the device is inserted into a line array hose, the spring strips maintain axial and longitudinal alignment of the sensor within the hose by pressing against the inner walls thereof. The counterweight assembly cooperates with bearing assemblies to limit and stabilize longitudinal rotation forces on the magnetic heading sensor due to roll experienced by the surrounding line array hose during its deployment and use. In this way, electromagnetically induced (i.e., by movement of conductors in a magnetic field) magnetic heading sensor errors are minimized.

It will be understood that many additional changes in the details, materials, steps and arrangement of parts, which have been herein described and illustrated in order to explain the nature of the invention, may be made by those skilled in the art within the principle and scope of the invention as expressed in the appended claims.

What is claimed is:

1. A magnetic heading sensor alignment and roll reducing device, comprising:

a generally cylindrical non-magnetic assembly having a first end and a second end, said cylindrical assembly further having a plurality of grooves at said first and second ends thereof, said grooves being located equiangularly on a circle with the center thereof located at said cylindrical assembly's center longitudinal axis;

means, positioned at and supported by said first and second ends, for supporting a magnetic heading sensor at either end thereof and for providing the sensor with rotational freedom about said center longitudinal axis, said means further being fabricated from non-magnetic materials;

a non-magnetic counterweight affixed to the sensor and having a center of gravity aligned with the sensor's center of gravity; and a plurality of longitudinal strips of a non-magnetic material, each of said strips having bent ends for fitting into corresponding ones of said grooves on said first and second ends of said cylindrical assembly.

2. A device as in claim 1 wherein the sensor has signal lines extending therefrom and said means positioned at and supported by said first and second ends further includes means for routing the signal lines from the sensor to the exterior of said cylindrical assembly.

3. A device as in claim 1 wherein each of said longitudinal strips has a plurality of bends for providing a spring-like action thereto.

4. A device as in claim 1 wherein said cylindrical assembly, said means positioned at and supported by said first and second ends, said counterweight and said strips are fabricated from non-magnetic materials selected from the group consisting generally of full hard brass, ceramics, polycarbonate, ceramics, fiberglass and plastic.

5. A device as in claim 1 wherein said plurality of longitudinal strips is at least three.

6. A magnetic heading sensor alignment and roll reducing device for substantially concentric installation in a flexible tubular housing, comprising:

an elongated, axially extending rigid cage for housing a magnetic heading sensor having signal lines extending from one end thereof, said cage having spaced end walls with recessions in their respective ends;

bearing means cooperating with each of said recessions for receiving the sensor's ends to enable the sensor to freely rotate about said cage's central longitudinal axis, wherein at one end of said cage, said cage and corresponding bearing means define a coaxial sleeve through which the signal lines may freely pass;

counterweight means affixed to the sensor wherein the center of gravity of said counterweight means and the center of gravity of the sensor are located at the same axial loci;

slip ring means, mounted to an outer face of said one end wall of said cage, for providing a rotating electrical connection with the signal lines; and a plurality of longitudinally extending strips of a non-magnetic metallic spring stock mounted in said end walls and disposed at equiangular positions about the periphery of said cage for cooperating with the inner surface of the tubular housing when said device is inserted therein and for resiliently maintaining said device at an axially concentric position therein.

7. A device as in claim 6 wherein each of said longitudinally extending strips has a plurality of bends for providing a spring-like action thereto.

8. A device as in claim 6 wherein said cage, said bearing means, said counterweight means and said strips are fabricated from non-magnetic materials selected from the group consisting generally of full hard brass, ceramics, polycarbonate, fiberglass and plastic.

9. A device as in claim 6 wherein said plurality of longitudinal strips is at least three.

10. A device as in claim 6 wherein said cage further includes means for adjusting the length thereof to accept various length sensors.

* * * * *